UNITED STATES PATENT OFFICE.

JOHN F. SANDERS, OF OGDEN, UTAH TERRITORY.

COMPOSITION FOR DISSOLVING THE COATING OF GOLD IN ORE.

SPECIFICATION forming part of Letters Patent No. 244,080, dated July 12, 1881.

Application filed April 16, 1881. (No specimens.)

*To all whom it may concern:*

Be it known that I, JOHN F. SANDERS, of Ogden, in the county of Weber and Territory of Utah, have invented an Improved Composition for Dissolving the Coating of Gold in Ore, of which the following is a specification.

The coatings that envelop gold in the ore, and that consist usually of various metallic oxides and of silver, have thus far been difficult to remove, except under the influence of extreme heat, which it is not possible at all places to apply, or by the waste of much valuable time. I have found that a mixture of cyanide of potassium and phosphoric acid, in about the proportions hereinafter mentioned, constitutes a powerful solvent for these coatings of gold ore.

I use in my mixture about sixteen parts of cyanide of potassium to one part glacial phosphoric acid. These two ingredients I mix shortly before the mixture is to be used. The mixture I place into the vessel that contains the covered ore. This vessel preferably is a rotating barrel made of iron or other proper material, and the composition above named is added with sufficient water to form a thick pulp with the raw gravel. The proportions of my improved mixture to the ore will vary, of course, with the varying thickness of covering of the gold. They will, however, be readily ascertained by testing with samples of the ore to be treated. The barrel is rotated or agitated in suitable manner for from fifteen to sixty minutes, as may be required. After agitation the mixture above mentioned will be found, on investigation, to have dissolved the oxides and the sulphurous coatings of the ore, and the agitation of the barrel or vessel removes the dissolved impurities, leaving the gold free and exposed, and permitting it to be amalgamated by the addition of quicksilver, in the usual manner.

The amalgam may be separated from the impurities which have joined with the improved mixture in the manner in which amalgams are usually separated from impurities.

I am aware that cyanides have already been used in the extraction of gold; also, that gold-bearing ores have been disintegrated in the presence of heat by various chemicals. This I do not claim. By using phosphoric acid in the presence of cyanide of potassium I am enabled to dissolve the impurities in a raw state and with great rapidity.

I claim—

The composition of cyanide of potassium and phosphoric acid, in about the proportions mentioned, for the purpose of dissolving the impure coatings of gold, substantially as specified.

JOHN F. SANDERS.

Witnesses:
WILLY G. E. SCHULTZ,
WILLIAM H. C. SMITH.